United States Patent [19]

Rokutan et al.

[11] Patent Number: 5,511,051
[45] Date of Patent: Apr. 23, 1996

[54] OPTICAL RECORDING/REPRODUCING APPARATUS CAPABLE OF MULTI-TRACK ACCESS FOR SIMULTANEOUS MULTITRACK RECORDING/REPRODUCTION

[75] Inventors: Takao Rokutan; Mitsuo Oshiba; Takefumi Sakurada; Naoaki Tani; Takumi Sugaya, all of Tokyo, Japan

[73] Assignee: Olympus Optical Co., Ltd., Tokyo, Japan

[21] Appl. No.: 524,076

[22] Filed: Sep. 6, 1995

Related U.S. Application Data

[63] Continuation of Ser. No. 103,970, Aug. 9, 1993, abandoned.

[30] Foreign Application Priority Data

Aug. 31, 1992 [JP] Japan ................... 4-231048
Aug. 31, 1992 [JP] Japan ................... 4-231049

[51] Int. Cl.$^6$ ........................................ G11B 7/00
[52] U.S. Cl. ........................... 369/44.28; 235/454
[58] Field of Search ........................ 369/44.37, 44.38, 369/112, 32, 43, 44.28, 44.27; 360/78.01, 78.05, 78.14; 235/454

[56] References Cited

U.S. PATENT DOCUMENTS

| | | | |
|---|---|---|---|
| 4,283,777 | 8/1981 | Curry et al. ................... | 369/32 |
| 4,598,393 | 7/1986 | Pierce et al. ................... | 369/44.38 |
| 4,720,825 | 1/1988 | Kokado ................... | 369/44.37 |
| 4,730,293 | 3/1988 | Pierce et al. ................... | 369/44.38 |
| 4,787,075 | 11/1988 | Matsuoka et al. ................... | 369/44.38 |
| 4,896,025 | 1/1990 | Hasegawa . | |
| 4,931,628 | 6/1990 | Wada . | |
| 4,982,391 | 1/1991 | Sakagami et al. . | |
| 5,008,521 | 4/1991 | Ohki et al. . | |
| 5,163,162 | 11/1992 | Berry et al. ................... | 369/43 |
| 5,191,572 | 3/1993 | Tsutsui et al. ................... | 369/44.38 |
| 5,195,081 | 3/1993 | Usui ................... | 369/112 |
| 5,237,556 | 8/1993 | Pierce ................... | 369/44.42 |
| 5,247,504 | 9/1993 | Akatsuka ................... | 369/44.38 |
| 5,267,226 | 11/1993 | Matsuoka et al. ................... | 369/44.37 |
| 5,274,615 | 12/1993 | Rokutan ................... | 369/44.32 |
| 5,293,568 | 3/1994 | Oshiba et al. . | |

FOREIGN PATENT DOCUMENTS

| | | | |
|---|---|---|---|
| 63-37876 | 2/1988 | Japan . | |
| 63-094438 | 4/1988 | Japan ................... | 369/44.38 |
| 02227835 | 9/1990 | Japan ................... | 369/44.37 |

*Primary Examiner*—Georgia Y. Epps
*Assistant Examiner*—P. W. Huber
*Attorney, Agent, or Firm*—Frishauf, Holtz, Goodman, Langer & Chick

[57] ABSTRACT

In an optical card recording/reproducing apparatus having a multi-track read type optical head in which a reproducing light beam is radiated on a plurality of tracks on an optical card having a large number of tracks parallel to each other so as to cause a plurality of reproducing light-receiving elements to simultaneously reproduce data of the plurality of tracks on which the reproducing light beam is radiated, when the light beam is to be moved to a target track to be reproduced, the maximum value of an error to be caused during moving the optical head is subtracted from a difference between a current track and the target track so as to determine a moving amount, or when an error generated during the movement of the optical head is represented by ±G, and the number of light-receiving elements is set to be 2G+1 or more, any one of the light-receiving elements can be located on the target track by moving the optical head once.

10 Claims, 13 Drawing Sheets

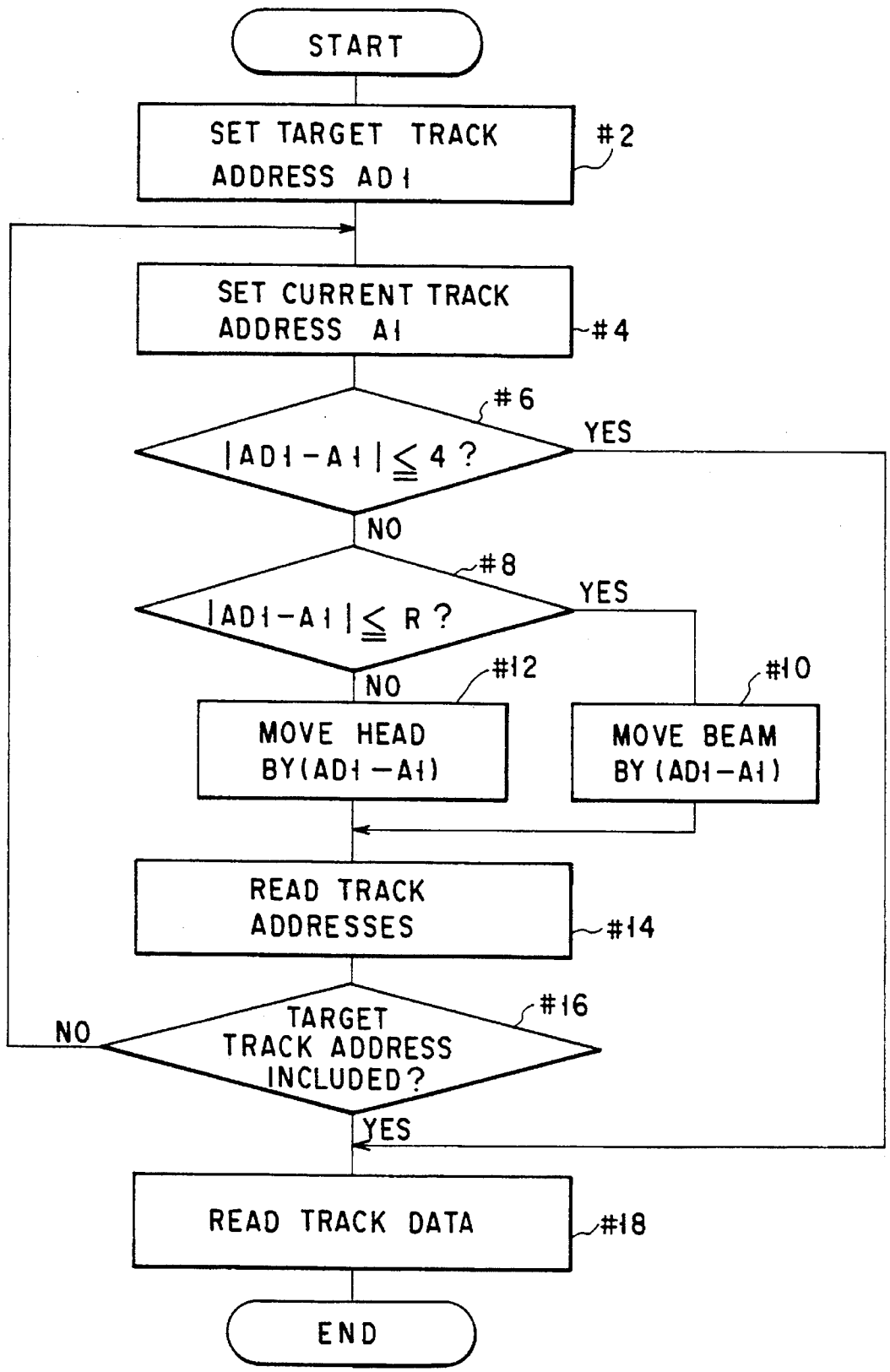
F I G. 11

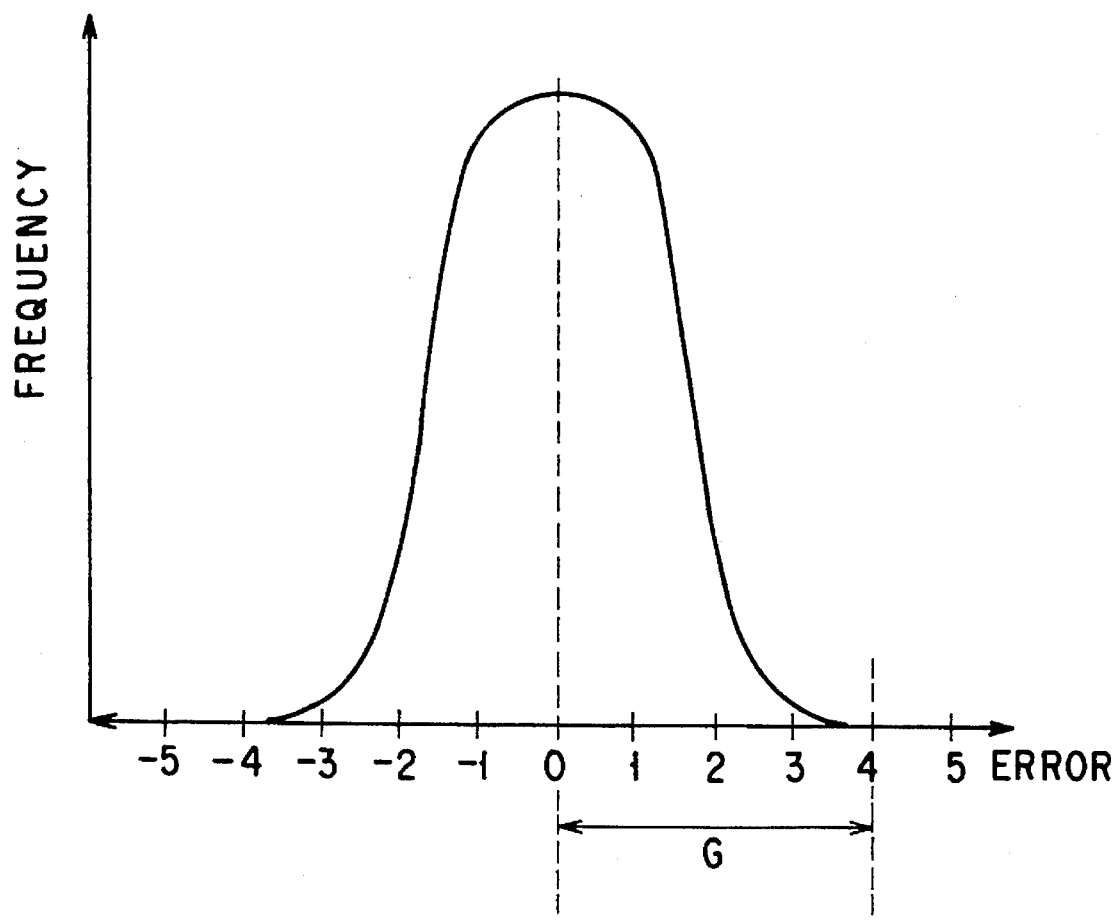
F I G. 15

OPTICAL RECORDING/REPRODUCING APPARATUS CAPABLE OF MULTI-TRACK ACCESS FOR SIMULTANEOUS MULTITRACK RECORDING/REPRODUCTION

This application is a Continuation of application Ser. No. 08/103,970, filed Aug. 9, 1993, now abandoned.

BACKGROUND OF THE INVENTION

1. Field of the Invention

The present invention relates to an optical recording/reproducing apparatus for recording/reproducing data using an optical recording medium such as an optical card.

2. Description of the Related Art

In recent years, a technique of data processing has been developed, and media for recording a large amount of data have been required. As one of the media, an optical recording medium has received a great deal of attention. An optical card is known as one of the optical recording media. As an apparatus for recording data onto the optical card and reproducing data of the optical card, an optical card recording/reproducing apparatus is practically used.

In the optical card, a laser beam is radiated through a lens on a data recording layer having a high reflectance and arranged on a substrate having the same shape as that of a credit card to form pits (holes) having a low reflectance on the recording layer by a thermally irreversible change, thereby writing data on the recording layer. The optical card has a recording capacity several or ten thousand times that of a conventionally used magnetic card. Although data cannot be rewritten in the optical card as in an optical disk, the recording capacity of the optical card is very large, i.e., 1 to 2 MG. Therefore, optical cards can be used in a variety of applications such as bankbooks, portable maps, prepaid cards used in shopping or the like. In addition, since the optical card has the characteristic feature of inhibiting data rewrite, the optical card can be used in applications such as individual health management cards which does not allow illegal data updating.

FIG. 1 is a plan view showing an optical card. A data recording portion 2 is formed at the central portion of a card main body 1, and ID portions 3a and 3b in which identification data such as track addresses are recorded are formed on both ends of the data recording portion 2.

The data recording portion 2 has, as shown in FIG. 2, a plurality of track guides 201, having a low reflectance, for guiding a light beam such as a laser beam in the track directions, and tracks 202 having a high reflectance and formed between the guide tracks 201. Data pits 203 having a low reflectance and representing recorded data are formed along the tracks 202. Although the tracks 202 are formed to extend over the entire length of the card main body 1, the end portions of the tracks are easily damaged or contaminated and have poor reliability. Further, in order to sufficiently stabilize a relative moving speed between the optical card and an optical head in the track directions, the ID portions 3a and 3b are formed at positions inward from the ends of the card at predetermined distances (e.g., 4 mm). The data recording portion 2 is defined between the ID portions 3a and 3b. Since data are read from both the directions of the optical card while the optical card is reciprocally conveyed, the ID portions 3a and 3b are formed so that track addresses can be read from both directions. Therefore, in FIG. 1, when a light beam is moved from the left to the right along the tracks, the left ID portion 3a is read; when a light beam is moved from the right to the left, the right ID portion 3b is read, thereby identifying a tracking address. Thus, the ID data such as the tracking address can be read out regardless of a scanning direction before data is read out.

The optical system of an optical head for reproducing data of the optical card is shown in FIG. 3. A laser beam emitted from a light-emitting element 4 such as a laser diode is collimated into a parallel beam by a collimator lens 5, diffracted by a diffraction grating 6, and focused on the optical card 1 through an objective lens 7. The focused light is reflected by the optical card 1, and is incident on a detector 10 through a mirror 8 and a detection system lens 9.

The focused light beam on the optical card 1, as shown in FIG. 2, is constituted by a 0th-order diffracted beam 601 called a main beam and two 1st-order diffracted beams 602 and 603 called sub-beams, all of which are diffracted by the diffraction grating 6. The main beam 601 is used to reproduce the data pits 203 or to generate a focus error signal for focusing control, and each of the sub-beams 602 and 603 is radiated half on a corresponding one of the track guides 201 and is used to generate a tracking error signal.

The light beam reflected by the optical card 1 and incident on the detector 10, as shown in FIG. 4, is constituted by three beams. Light beams 101, 102, and 103 shown in FIG. 4 correspond to light beams 601, 602, and 603 shown in FIG. 2, respectively. In the detector 10, an optical system is constituted such that the light beam 101 is radiated on the dividing line of detection regions 101a and 101b obtained by dividing a square detection region, the light beam 102 is radiated on the center of a detection region 102a, and the light beam 103 is radiated on the center of a detection region 103a.

In addition, the optical system is constituted such that the light beam 101 is moved in the direction perpendicular to the dividing line of the detection regions 101a and 101b when the beam on the optical card is defocused. Therefore, when a difference between amounts of light incident on the detection regions 101a and 101b is calculated, a focus error signal representing an error of the in-focus position can be obtained. When the objective lens 7 is driven by a driving means 11 according to the focus error signal to be brought close to or separated from the card 1, focusing control is performed such that the light beam is kept in an in-focus state on the card.

When the beams 602 and 603 shown in FIG. 2 are moved in the direction perpendicular to the tracks 202, the overlapping areas of the beams 602 and 603 on the track guides 201 are changed. Therefore, tracking error signals representing errors of the beams 602 and 603 from the centers of the track guides 201 can be obtained by calculating an output difference between the detection regions 102a and 103a. The objective lens 7 is moved by the driving means 11 in the direction perpendicular to the track guides 201 according to the tracking error signal, so that tracking control is performed to keep the beam 601 at the center of each of the tracks 202.

FIG. 5 is a view for explaining an access method of an arbitrary track, which method is employed in the optical data recording/reproducing apparatus arranged as described above.

In FIG. 5, as in FIGS. 2 and 4, reference numerals 201 denote track guides for guiding the light beam in the track directions; 202, tracks formed between the track guides 201; 601, a main beam for reproducing data pits formed along the tracks 202 and for generating focus error signals; and 602 and 603, sub-beams, each formed to half overlap a corresponding one of the track guides 201, for generating tracking error signals. In FIG. 5, both the ends of the tracks 202 represent both the ends of the card, arrows a, b, c, and d indicate the moving direction of the beam on the card. In general, the beam is moved on the card in a direction a or c perpendicular to the tracks by moving an optical head itself or an objective lens, and the beams on the card are moved in a direction b or d parallel to the tracks by moving the card with respect to the optical head.

Data reproduction of a given track is designated by an external apparatus (not shown) such as a host computer. This given track designated by a reproduction request is referred to as a target track address. In the example of FIG. 5, the target address is represented by AD1. A light beam is moved in the direction of an arrow a by a difference between a track address AD at which the main beam 601 is currently located and the target track address AD1.

Since the distance in the direction of the arrow a to move the beam from the current address to the target address is generally long, the light beam is moved by moving the entire optical head. Access performed such that the entire optical head is moved is called "coarse access". In the coarse access, the position of the moved beam is set within an error range around the target track, and the light beam cannot always reach the target track by performing coarse access once because of the following reasons. A scale used in the coarse access has an insufficient accuracy, the objective lens is vibrated, and the apparatus itself is vibrated, or the like.

In FIG. 5, it is assumed that the beams 601, 602, and 603 are moved three tracks before the target track address AD1 (i.e., a track address AD0) due to a coarse access error. Thereafter, the card is moved in the direction parallel to the tracks, the beams 601, 602, and 603 are relatively moved in the direction of an arrow b, so that the above-described ID portion 3a is reproduced. When it is determined by the readout data from the ID portion 3a that the current track address is AD0, the beams 601, 602, and 603 are moved again by a distance corresponding to the difference between the current track address AD0 and the target track address AD1. This moving distance in this case is shorter (about 1 to 8 tracks at most) than the distance in the direction of the arrow a, and the beams are moved by changing the irradiation positions of the beams by shifting the objective lens 7 track by track. This operation is called a track-jump operation. Short-distance moving performed by repeating the track-jump operation is called "fine access". Since the fine access has no error factors unlike the coarse access, accurate moving can be performed. Note that, when there is a reproduction request, and the difference between a current track and a target track is small, the fine access is first performed without performing the coarse access.

In FIG. 5, the track-jump operation is performed three times as indicated by arrows c1, c2, and c3 to cause the beam 601 to reach the track 202 of the target track address AD1. Thereafter, the card is moved in the direction parallel to the tracks, and the beams 601, 602, and 603 are relatively moved in the direction of an arrow d, so that the ID portion 3b is reproduced. When it is confirmed by the read data from the ID portion 3b that the track address of the current track is AD1, data is reproduced from the data recording portion 2.

Data is recorded in a predetermined direction, but the data is reproduced in two forward and backward directions, so that a scanning direction may be reversed between write access and read access. Therefore, reproduced data is temporarily written in a buffer memory, and a data string is inverted in a direction of time axis in accordance with the reproduction direction, so that the data can be correctly read out in two forward and backward directions.

When a moving distance between the current track address and the target track address is long as described above, the target track cannot easily be accessed by performing coarse access once, and an operation constituted by coarse access and fine access is performed. Therefore, a total of at least two track scannings must be respectively performed after the coarse access and after the fine access. As a result, a long time is required for a reproduction operation, and the reproduction operation cannot be performed at very high speed.

The drawback of the above access method is also applicable to the recording operation.

SUMMARY OF THE INVENTION

The present invention has been made in consideration of the above circumstances, and has as its object to provide an optical data recording/reproducing apparatus capable of quickly accessing a target track, shortening a processing time for data reproduction, and increasing a reproduction speed.

According to the present invention, there is provided an apparatus for reproducing data, using light, from a data recording medium having a large number of data recording tracks, the apparatus comprising:

means for generating a light beam which simultaneously scans a plurality of tracks;

detection means having a plurality of detection elements for detecting data of the plurality of tracks which are scanned by the light beam; and means for moving the light beam, in response to a reproduction request of a target track, by a difference between a track at which the light beam is currently located and the target track, whereby data of the target track is detected by any one of said plurality of detection elements.

According to the present invention, there is provided a method of simultaneously reproducing data of a plurality of tracks from an optical card using a multi-track type optical head for generating a light beam radiated on a plurality of tracks, comprising the following steps of:

(a) checking whether a difference between a track in which a predetermined part of the light beam is currently located and a target track is not more than a half of the number of multi-tracks;

(b) when the difference is not more than the half of the number of multi-tracks, reproducing data of a plurality of tracks at which the light beam is currently located, and when the difference is more than the half of the number of multi-tracks, checking whether the difference is not more than a predetermined value and not less than the number of multi-tracks;

(c) when the difference is not more than the predetermined value, moving the light beam in accordance with the difference, and when the difference is not less than the predetermined value, moving said optical head in accordance with the difference;

(d) checking whether the target track is included in an irradiation region of the light beam; and (e) when the target track is not included, returning control to the step (a), and when the target track is included, reproducing data of the plurality of tracks at which the light beam is currently located.

According to the present invention, there is provided an apparatus for simultaneously reproducing data of a plurality of tracks from an optical card using a multi-track type optical head for generating a light beam radiated on the plurality of tracks, wherein, when the number of tracks of a moving error to be caused by moving said optical head is represented by ±G, the number of multi-tracks which are simultaneously reproduced by said optical head is set to be not less than 2G.

According to the present invention, there is provided another apparatus for simultaneously reproducing data of a plurality of tracks from an optical card using a multi-track type optical head for generating a light beam radiated on the plurality of tracks, wherein, when the number of tracks of a moving error to be caused by moving said optical head is represented by ±G, an amount of movement of said optical head is corrected in accordance with G.

According to the present invention, a plurality of tracks can be simultaneously reproduced. Therefore, even when a difference between a track at which a light beam is currently located and a target track is large, any one of the plurality of detection elements is caused to correspond to the target track, and the data of the target track can be reproduced. In this manner, the light beam can reach the target track by moving the optical head once, and track scanning need not be performed twice or more. Therefore, a processing time for data reproduction can be shortened, and a reproduction speed can be increased.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 11 is a flow chart for explaining the track access in the first embodiment;

FIG. 15 is a view for explaining the principle of a third embodiment;

DETAILED DESCRIPTION OF THE PREFERRED EMBODIMENTS

A preferred embodiment of an optical recording/reproducing apparatus according to the present invention will now be described with reference to the accompanying drawings.

Figure 6:
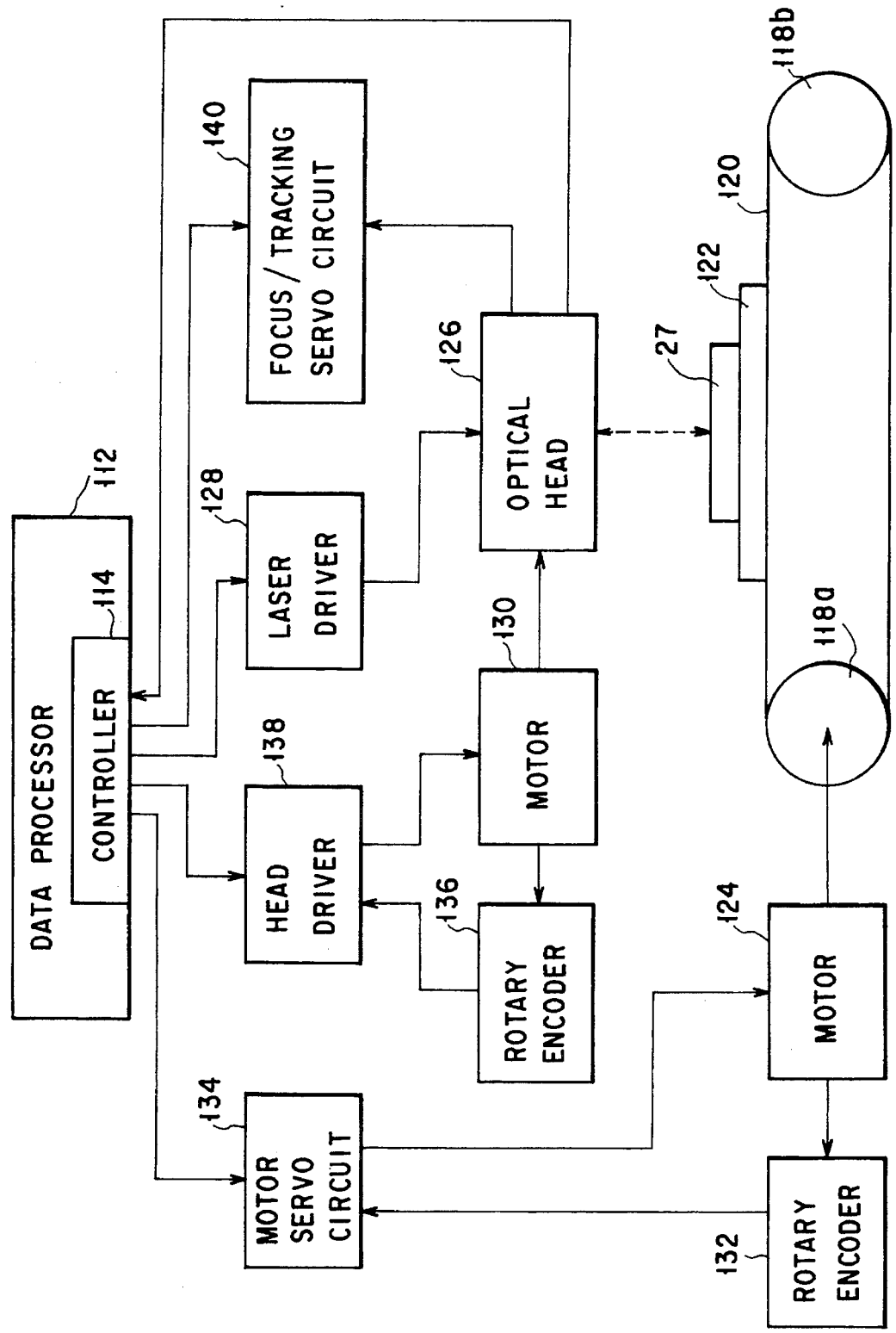
FIG. 6 is a schematic block diagram showing an optical reproducing apparatus according to a first embodiment of the present invention.

FIG. 6 is a block diagram schematically showing the structure of an optical reproducing apparatus using an optical card as an embodiment of the optical recording/reproducing apparatus. A data processor 112 manages the various types of required control operations of the whole system and has a controller 114 for controlling each of the elements that are to be controlled. The data processor 112 performs data write and processes readout data. Write data and the readout data may be exchanged with an external host system, or the data processor 112 itself may have an input/output means.

When an optical card 27 is inserted in the apparatus main body through an insertion port formed in a housing (not shown), the optical card 27 is loaded on a conveyor table 122 provided at a predetermined position on a conveyor belt 120 applied between a pair of pulleys 118a and 118b that are arranged a predetermined distance apart.

Figure 1:
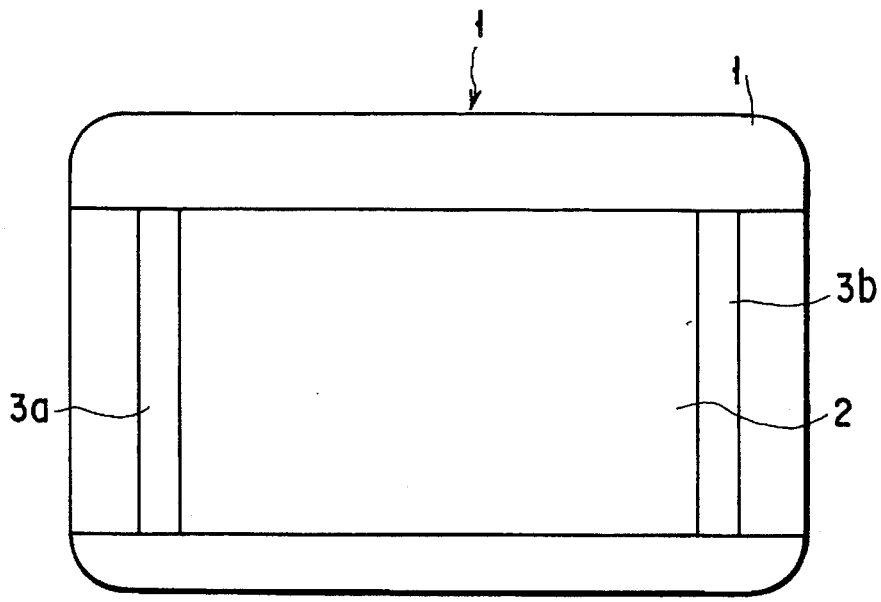
FIG. 1 is a view showing a conventional optical card.
Figure 2:
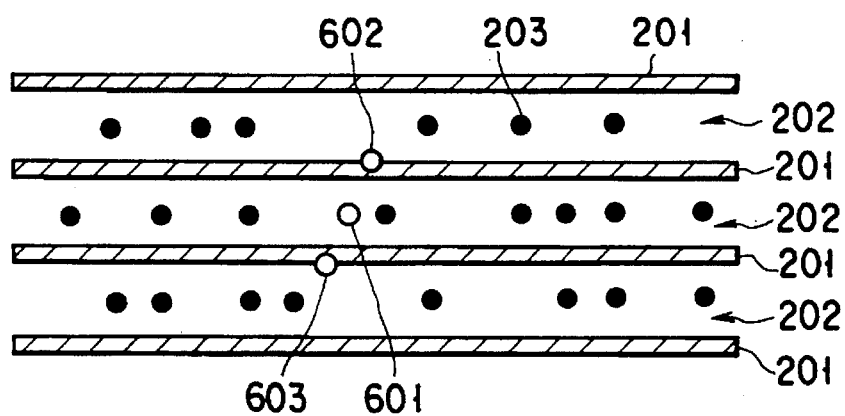
FIG. 2 is a view for explaining a data recording portion of the conventional optical card.
Figure 3:
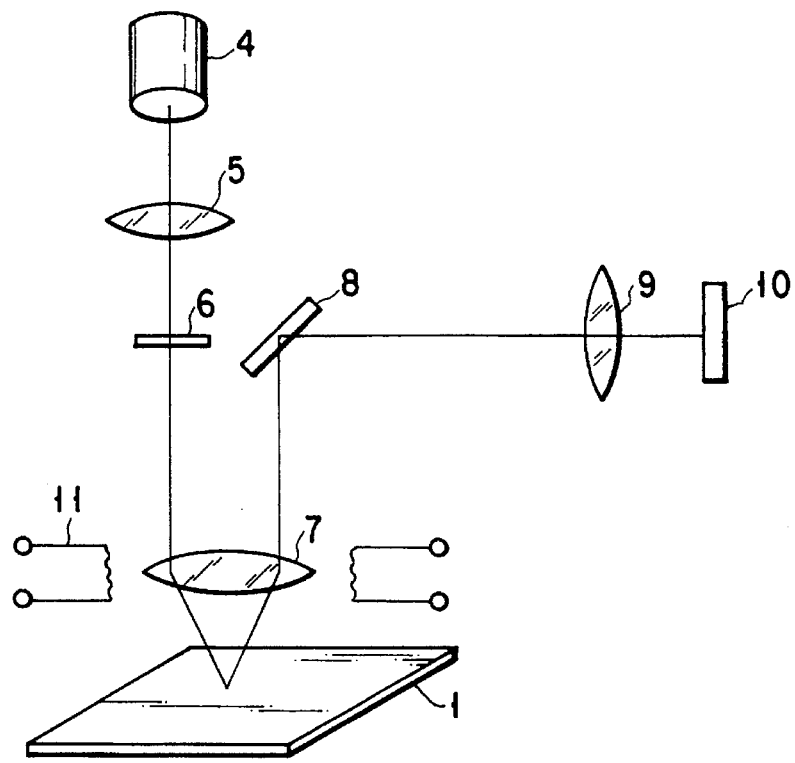
FIG. 3 is a schematic view showing the arrangement of an optical system of a conventional optical reproducing head.
Figure 4:
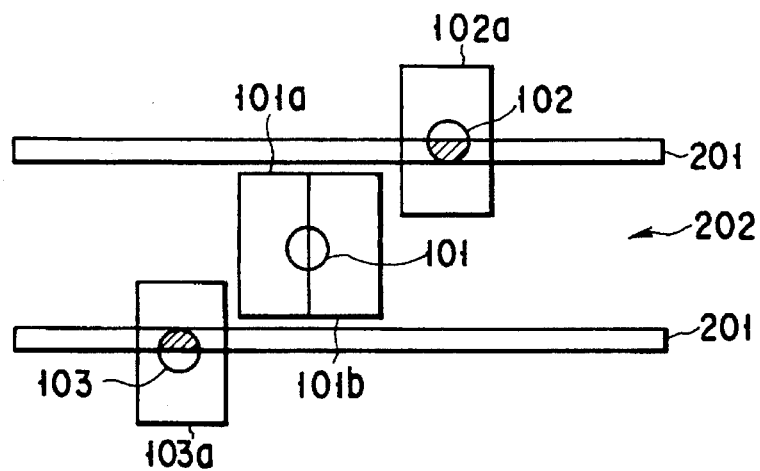
FIG. 4 is a view showing an optical image projected on a photodetector of the conventional optical reproducing head.
Figure 5:
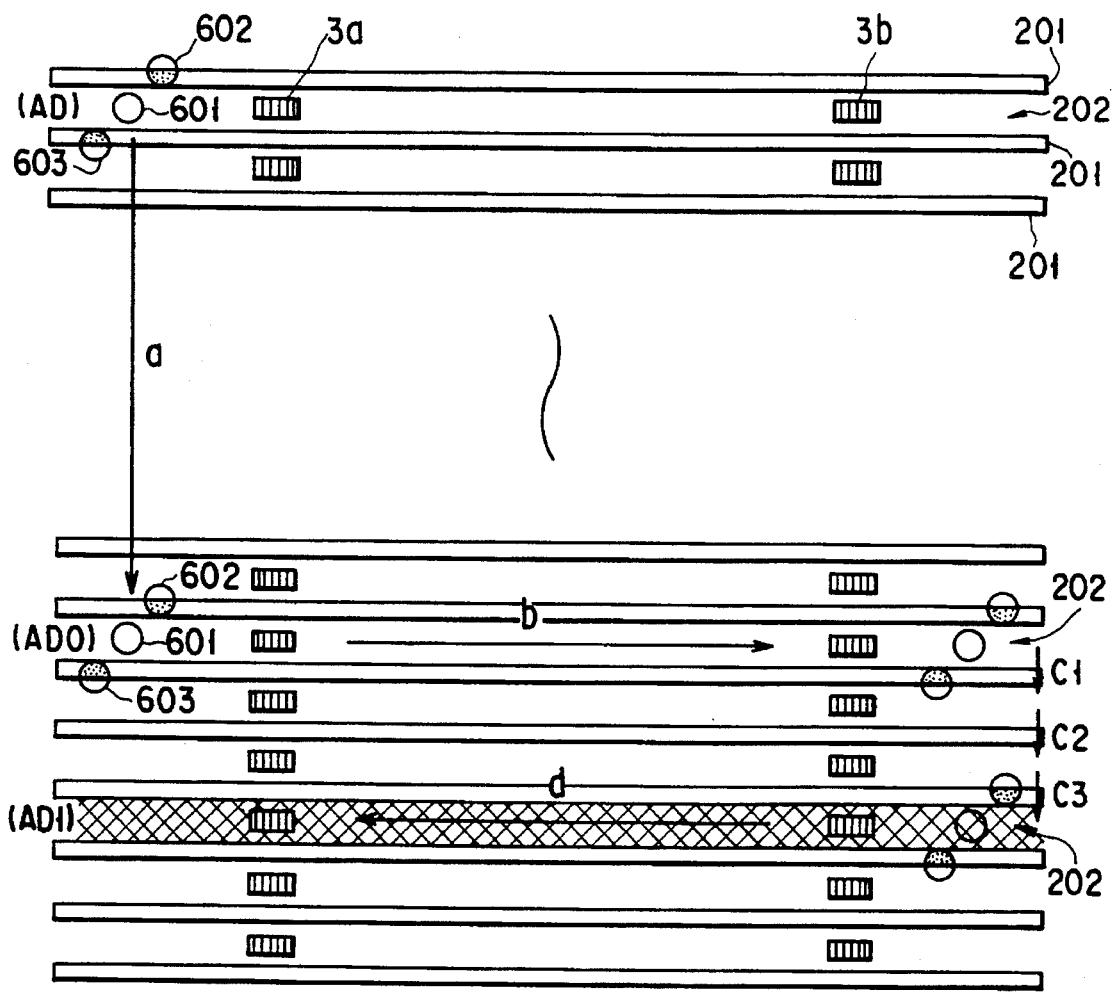
FIG. 5 is a view for explaining track access in the conventional optical card recording/reproducing apparatus.

The optical card 27 has the same structure as that shown in FIG. 1 and has a data recording portion 2 in which a plurality of tracks are arranged. ID portions 3a and 3b are arranged in the vicinities of the two ends of each track.

A motor 124 is connected to the pulley 118a. When the motor 124 is controlled to rotate in the clockwise/counterclockwise direction, the pulley 118a is rotated in the clockwise/counterclockwise direction. When the pulley 118a is rotated in the clockwise/counterclockwise direction, the conveyor belt 120 is moved in the forward/reverse direction, thereby reciprocally moving the conveyor table 122. Then, the optical card 27 loaded on the conveyor table 122 can be repeatedly moved in the direction of tracks.

The apparatus main body has an optical head 126 foe recording or reading data by radiating a light beam on the tracks of the optical card 27. The optical head 126 is connected to a laser driver 128. The laser driver 128 drives a semiconductor laser provided in the optical head 126 for generating the light beam, and is connected to the controller 114. The controller 114 controls the drawing of the semiconductor laser, thereby controlling radiation of the light beam emitted from the optical head 126 onto the optical card 27. The optical head 126 is arranged at a position above, e.g., the central position of an area (between the pulleys 118a and 118b) where the conveyor belt 120 is moved. The optical head 126 is connected to a motor 130. When the motor 130 is driven, the optical head 126 can be moved in a direction perpendicular to the moving direction of the conveyor belt 120, i.e., in a direction across the tracks of the optical card 27 loaded on the conveyor table 122.

With this structure, when the motor 124 is driven, the optical card 27 is reciprocally conveyed in the direction of tracks, and when the motor 130 is driven, the optical head 126 is reciprocally moved in a direction perpendicular to the tracks. Hence, when the optical head 126 and the optical card 27 are moved relative to each other in the direction of tracks, each track of the optical card 27 can be scanned by the optical head 126.

The motor 124 is connected to a rotary encoder 132 for detecting the position of the conveyor table 122 with respect to the optical head 126. The rotary encoder 132 generates a pulse at every predetermined rotational angle. One pulse of the rotary encoder 132 corresponds to, e.g., the relative moving amount of 50 μm of the conveyor table 122 with respect to the optical head 126.

The motor 124 is controlled by a motor servo circuit 134. The motor servo circuit 134 is connected to the rotary encoder 132 and the controller 114. The motor servo circuit 134 detects the convey speed of the optical card 27 based on the positional data sent from the rotary encoder 132 and controls the rotational speed of the motor 124. Here, a control command is sent from the controller 114 to the motor servo circuit 134 so that the convey speed becomes a constant speed in the range from the ID portions 3a to 3b, in FIG. 1, of the optical card 27, and the rotational speed of the motor 124 is controlled based on the convey speed of the optical card 27.

The motor 130 connected to the optical head 126 is connected to a rotary encoder 136 for detecting the position of the optical head 126 with respect to (the tracks of) the optical card 27 in a manner similar to that of the motor 124. The motor 130 and the rotary encoder 136 are connected to an optical head driver 138, and the motor 130 is controlled by the optical head driver 138. The optical head driver 138 is connected to the controller 114. A control command is sent from the controller 114 to the optical head driver 138 based on the positional data and the like sent from the rotary encoder 136, thereby controlling the motor 130.

A focus/tracking servo circuit 140 is provided in the apparatus and connected to the optical head 126 and the controller 114. The focus/tracking servo circuit 140 drives the optical head 126 in the focusing direction based on a focus error signal and a direction perpendicular to the tracks based on a tracking error signal generated by the light beam reflected by the optical card 27. Then, the incident light always traces the target track of the optical card 27 in the in-focus state.

Figure 7:
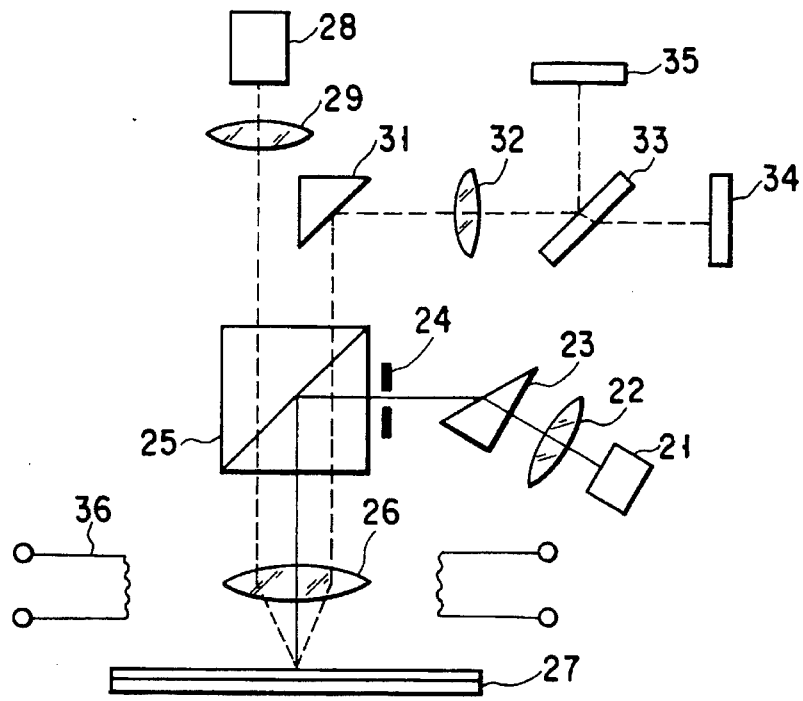
FIG. 7 is a schematic view showing the arrangement of an optical head in the first embodiment.

FIG. 7 is a schematic view showing the arrangement of the optical head 126 applied to the first embodiment.

The present invention relates to a multi-track read type apparatus capable of simultaneously reading a plurality of tracks during data reproduction. In this case, a recording light beam generated by a semiconductor laser 21 is collimated into an almost elliptical parallel beam by a collimator lens 22. The parallel beam is guided to a shaping prism 23 so as to collimate the beam into an almost circular beam obtained by enlarging the short axis of the elliptical beam. In addition, the resultant beam is reduced by a circular stop 24 such that the spot size of the recording light beam has a predetermined value.

Figure 8:
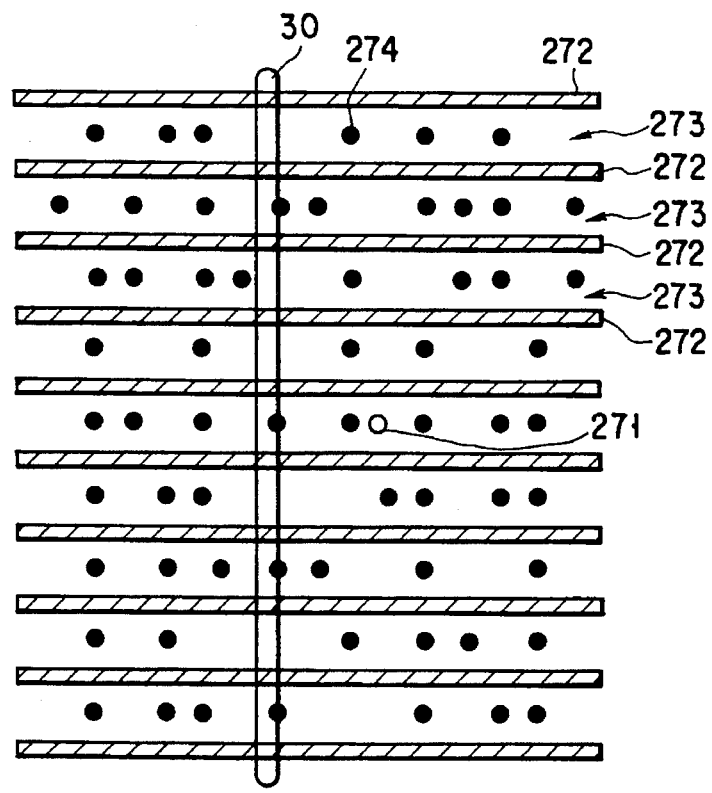
FIG. 8 is a schematic view showing a data recording portion of an optical card used in the first embodiment.

The above circular beam is mostly constituted by S-polarized light component due to the nature of the semiconductor laser 21, and most of the circular beam is reflected by the reflection surface of a polarization beam splitter 25 so as to be incident on the optical axis of an objective lens 26. This beam is focused on the optical card 27 through the objective lens 26 so as to form a circular light spot 271 as shown in FIG. 8. An energy density is locally increased by the light spot 271 to cause a thermally irreversible change on the recording layer of the optical card 27 having a high reflectance, thereby forming data pits having a low reflectance. The objective lens 26 is driven by the objective lens driving means 36 so as to be brought close to or separated from the card on the basis of a focus error signal, and focusing control is performed such that the light beam is kept in an in-focus state on the card 27. The objective lens 26 is driven by the objective lens driving means 36 in the direction perpendicular to the tracks on the basis of a tracking error signal, and tracking control is performed such that the light beam is kept at center of the track.

The optical card 27, as shown in FIG. 8, has a plurality of track guides 272 and a plurality of tracks 273 formed between the track guides 272. When a pulse modulated with data to be recorded is supplied to the semiconductor laser 21 to cause the semiconductor laser 21 to perform pulsed emission, data pits 274 having a low reflectance are sequentially formed by the light spot 271 along the tracks 273, so that data is recorded as a pit array.

On the other hand, reproducing light is obtained using, as a light source, a light-emitting diode 28 such as an end-face light-emitting diode having a slit-like light-emitting face, and the light is collimated into parallel light by a collimator lens 29. Only P-polarized component of the light passes through the polarization beam splitter 25, and is incident on a position shifted from the optical axis of the polarized light through the objective lens 26, so that an image on the light-emitting face of the light-emitting diode 28 is formed on the optical card 27. The optical image formed on the optical card 27 by the light-emitting diode 28 is indicated by reference numeral 30 in FIG. 8 as a reproducing light beam. A relative distance between the reproducing light beam 30 and the recording light spot 271 formed by the pulsed emission of the semiconductor laser 21 can be set such that an angular difference is set between the optical axis of the reproducing light beam 30 and the optical axis of the recording light beam before they are incident on the objective lens 26.

The reproducing light beam 30 imaged on the optical card 27 by the light-emitting diode 28 is subjected to light amount modulation on the optical card 27 depending on the presence/absence of the track guides 272 and the data pits 274 so as to be regularly reflected, the reproducing light beam 30 passes through the objective lens 26 in the reverse direction, and the light beam is guided to the polarization beam splitter 25 while the light beam is set almost parallel. In addition, the reproducing light beam 30 has P-polarized component because the reproducing light beam 30 is regularly reflected, and most of the reproducing light beam 30 passes through the polarization beam splitter 25. The reproducing light beam 30 is guided to a condenser lens 32 through a reflecting mirror 31, is focused by the condenser lens 32, is split by a half mirror 33, and is enlarged and projected on the light-receiving surface of a photodetector 34 and a focusing photodetector 35 as the optical image on the optical card.

In the optical system according to this embodiment, the reproducing light beam 30 is incident on a position shifted from the optical axis of the objective lens 26, thereby performing so-called off-axis focus detection. For example, a two-divided light-receiving element for detecting movement of the image of the reproducing light beam spot caused by a focus error is arranged on the focusing photodetector 35.

Figure 9:
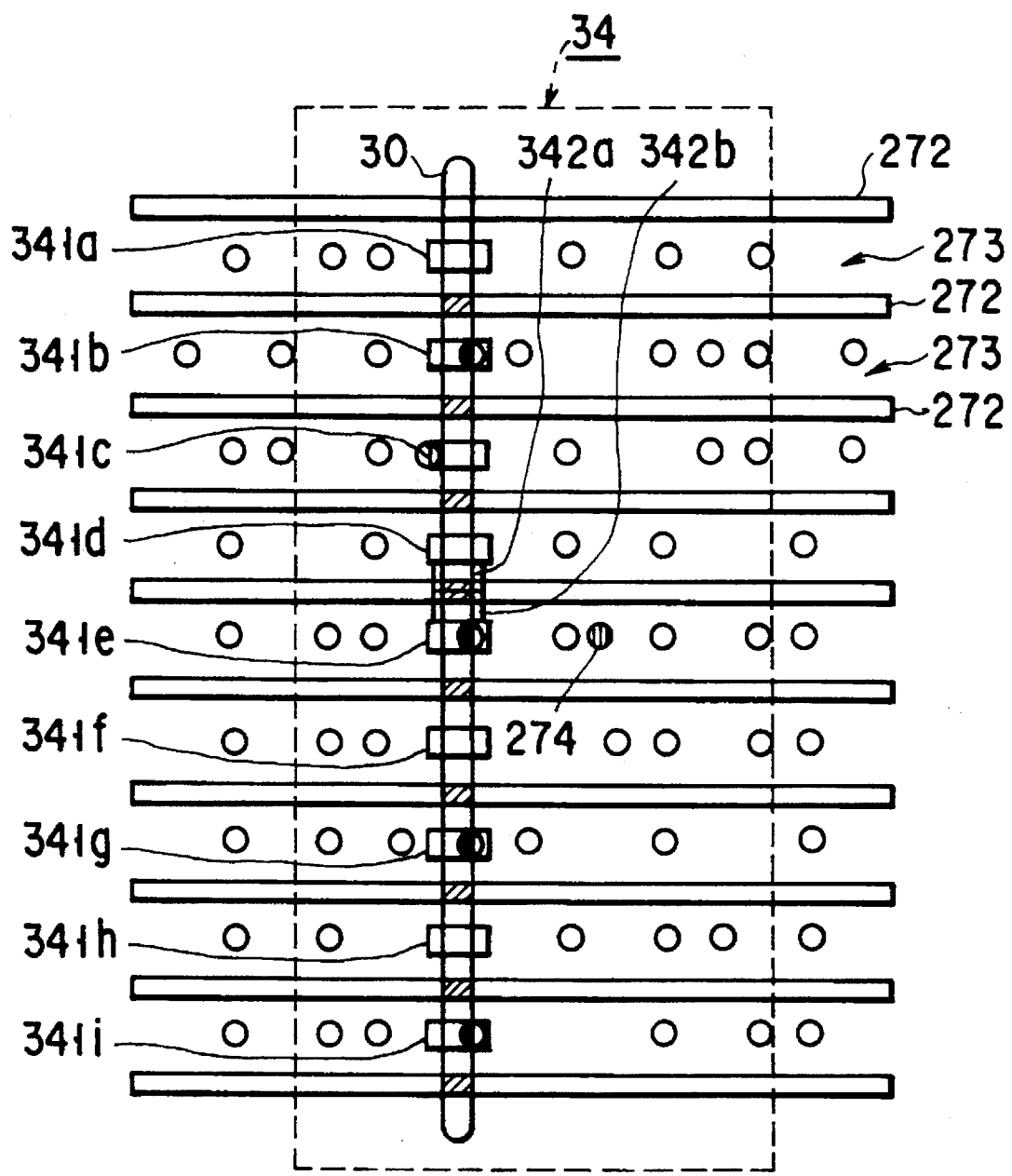
FIG. 9 is a view showing an optical image projected on a photodetector of an optical head in the first embodiment.

FIG. 9 shows an optical image projected on the photodetector 34. In this case, reproducing light-receiving elements 341a to 341i and tracking light-receiving elements 342a and 342b are arranged on the photodetector 34. The enlarged and projected reproducing light beam 30 is focused at an appropriate position on these light-receiving elements. In the tracking light-receiving elements 342a and 342b, a change in position of the image of track guides 272 caused by a tracking error is detected as a change in an amount of received light by the difference between an amount of light received by the tracking light-receiving elements 342a and 342b so as to generate a tracking error signal. The reproducing light-receiving elements 341a to 341i simultaneously detect the presence/absence of the pits 274 in each of the tracks 273 by changes in an amount of light received by the reproducing light-receiving elements 341a to 341i, thereby outputting a reproduced signal.

Figure 10:
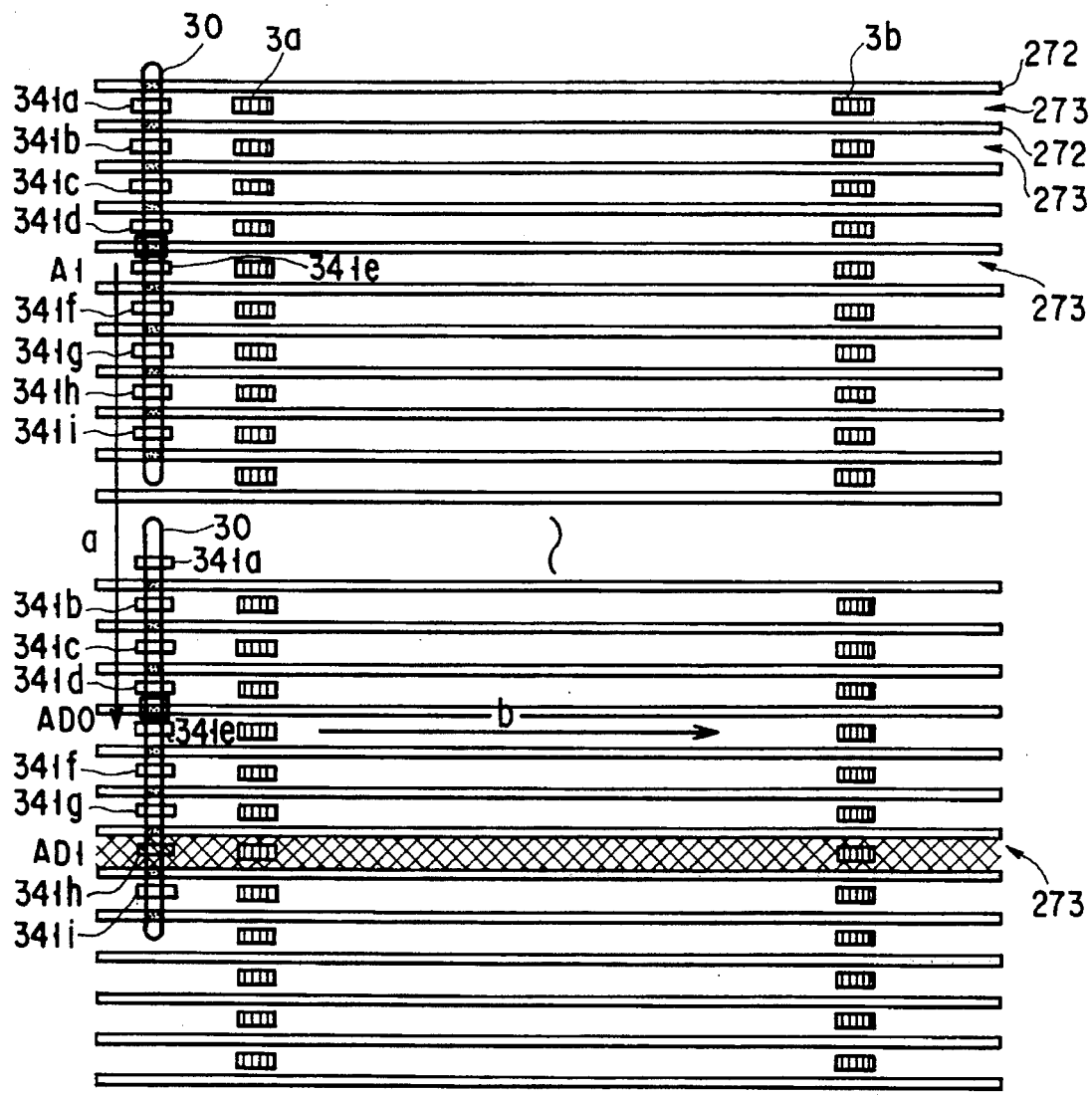
FIG. 10 is a view for explaining track access in the first embodiment.

FIG. 10 is a view for explaining track access performed by the above optical reproducing apparatus.

In FIG. 10, as in FIGS. 8 and 9, reference numerals 272 denote track guides; 273, tracks formed between the track guides 272; 30, a reproducing light beam radiated on the plurality of tracks 273; and 341a to 341i, reproducing light-receiving elements for reproducing data of the tracks 273 on which the reproducing light beam 30 is radiated.

In the above arrangement, since the nine reproducing light-receiving elements 341a to 341i are used, a plurality of track addresses are present at a position on which the reproducing light beam 30 is radiated. Here, assume that an address A1 of the tracks 273 corresponding to the central reproducing light-receiving element 341e of the reproducing light-receiving elements 341a to 341i is set to be a current track address at which the reproducing light beam 30 is currently located.

When data reproduction of a given track address is designated by a host computer (not shown), the flow chart shown in FIG. 11 is executed.

A given track address AD1 is set as a target track address in step #2. An address A1 of a track 273 corresponding to the central reproducing light-receiving element 341e of the reproducing light-receiving elements 341a to 341i is set as a current track address in step #4.

It is determined in step #6 whether |AD1−A1| is 4 or less. The |AD1−A1| set to be 4 or less means that any one of the nine reproducing light-receiving elements 341a to 341i is located at the target track address AD1. Therefore, the flow jumps to step #18, and a data reproducing operation is performed.

When it is determined in step #6 that |AD1−A1| is not 4 or less, a light beam must be moved, and it is determined in step #8 whether |AD1−A1| is a reference value R (e.g., 10) or less. This reference value is used to check whether coarse access for moving the head itself must be performed to move the beam or only fine access may be performed to move the beam. If YES in step #8, the objective lens is shifted by the objective lens moving means 36 to shift the light beam in the directions perpendicular to the tracks by a distance corresponding to |AD1−A1| (fine access) in step #10.

The moving direction of the light beam depends on the sign of (AD1−A1). If NO in step #8, in step #12, the reproducing light beam 30 is moved by a distance corresponding to |AD1−A1| in the direction perpendicular to the tracks by using coarse access for moving the optical head itself. The moving direction depends on the sign of (AD1−A1).

The card is moved in a track direction to read out a track address from the ID portion 3a of each of the nine tracks in step #14. It is determined in step #16 whether the target track address AD1 is included in the nine track addresses.

If NO in step #16, the flow returns to step #4, and the light beam is again moved by updating the current track address A1. If YES in step #16, data is read from the data portion 2 of the target track in step #18.

The above flow chart will be described again in accordance with the example shown in FIG. 10. A target track address at which data reproduction is requested is represented by AD1, and a current track address at which the light beam is located is represented by A1 (A1<AD1 and |AD1−A1|>R). In this case, in step #12, the reproducing light beam 30 is moved by a track count of (AD1−A1) in the direction of an arrow a in FIG. 10.

In this case, it is assumed that the center of the reproducing light beam 30 is moved three tracks before the target track address AD1 due to an error of coarse access. That is, it is assumed that the track address corresponding to the reproducing light-receiving element 341e is an address AD0 which is smaller than the target track address AD1 by three tracks.

If only one reproducing light-receiving element is arranged as in the prior art, the current track address must be updated to AD0 so that the light beam is further moved by (AD1−AD0). In this embodiment, since a plurality (nine in this case) of reproducing light-receiving elements 341a to 341i are arranged, as is apparent from FIG. 10, even when the reproducing light-receiving element 341e at the central position is located at the track of the address AD0, any one (the reproducing light-receiving elements 341h in this case) of the reproducing light-receiving elements 341a to 341i is located at the target track address AD1. Therefore, in this state, the card is moved to relatively move the reproducing light beam 30 in the direction of an arrow b in FIG. 10, and the data of the ID portion 3a is reproduced. It can be confirmed that one of the light-receiving elements 341a to 341i is located at the target track address AD1, and the data of the target track is reproduced.

As described above, according to this embodiment, a multi-track reading head is realized by the combination of the reproducing light beam 30 radiated on the nine tracks and the reproducing light-receiving elements 341a to 341i corresponding to the reproducing light beam 30. Therefore, even when a distance between a track at which a light beam is currently located and a target track to 10 be reproduced is long, and the beam is moved in the direction perpendicular to the tracks by moving the optical head itself (coarse access), the data of the target track can be reproduced by moving optical head once (coarse access). Therefore, unlike the prior art, the data of the target track can be reproduced by only the coarse access processing, and fine access processing can be omitted. Although track scanning must be performed twice in normal access, track scanning can be reduced to once in the access of this embodiment. As a result, a processing time for data reproduction can be considerably shortened, and the data reproduction can be performed at high speed.

As described above, the first embodiment relates to correct access of only the target track and the multi-track reading is not performed. If the data of several tracks starting with the target track are requested, the flowchart shown in FIG. 11 is modified. If the data of three tracks are to be simultaneously read, it is determined in the step #16 whether the target track address AD1 and the following two addresses are included in the nine track addresses.

Other embodiments of the present invention will be described below.

In the first embodiment, an error in coarse access is unknown, a target track may be located out of an error range depending on the situation, and the data of the target track cannot be reproduced by performing coarse access once. However, when the range of errors in the above coarse access is known in advance, access can be performed at a higher efficiency by performing the following track access.

As the reasons for generating an error in coarse access, the insufficient accuracy of a scale used in the coarse access, vibration of an objective lens, and vibration of an apparatus itself are known. The values of errors generated by the above reasons in coarse access vary, but often fall within a predetermined range.

A reproduction command from an external apparatus such as a host computer often represents reproduction of continuous tracks. Alternatively, a track address may be sequentially increased to repeat a reproduction command for each track. That is, even when the reproduction command from the host computer is for one given track, the track address of the next reproduction command becomes the address of a track adjacent to the given track with a high probability.

In the second embodiment, when the maximum value of an error expected by performing coarse access once is represented by ±G (track count) regardless of an amount of coarse access, and when the number of multi-tracks which can be reproduced at a time is represented by N, N/2 (decimal parts are rounded off) is represented by M. Note that, when N is an odd number, a track address corresponding to the reproducing light-receiving element located at the central position of reproducing light-receiving elements is defined as an address at which a current reproducing light beam is located. When N is an even number, there are two reproducing light-receiving elements located at the central portion. Of the tracks corresponding to the two reproducing light-receiving elements, the track having a larger address is defined as a track having an address at which a current reproducing light beam is located.

In coarse access, a difference between a current track A1 and a target track AD1 is calculated, the value M is added to this difference, and the absolute value of error |G| is subtracted from the resultant value, thereby obtaining a track count as a moving amount for track access. The reason why the value M is added to the difference (AD1–A1) is to locate the reproducing light-receiving element 341a at the target track. In the first embodiment, since it is desired to locate the reproducing light-receiving element 341e at the target track, the moving distance is calculated by the difference (AD1–A1). A moving track count during the coarse access in the second embodiment is given by:

AD1–A1+M–|G|

In this case, the maximum value G of the error must satisfy a condition |G|≦M. If the coarse access error is +4, the reproducing light-receiving element 341a is located at a track address (AD1+4) after the coarse access by AD1–A1+M (+4). Therefore, if the absolute value of error is subtracted from AD1–A1+M (+4)–4, the reproducing light-receiving element 341a is located at the target track address AD1 after the coarse access. On the other hand, if the coarse access error is –4, the reproducing light-receiving element 341e is located at the track address AD1 after the coarse access by AD1–A1+M (–4). Therefore, if the absolute value of error is subtracted from AD1–A1+M (–4) –4, the reproducing light-receiving element 341i is located at the target track address AD1 after the coarse access. In this manner, an error in coarse access is compensated.

Figure 12:
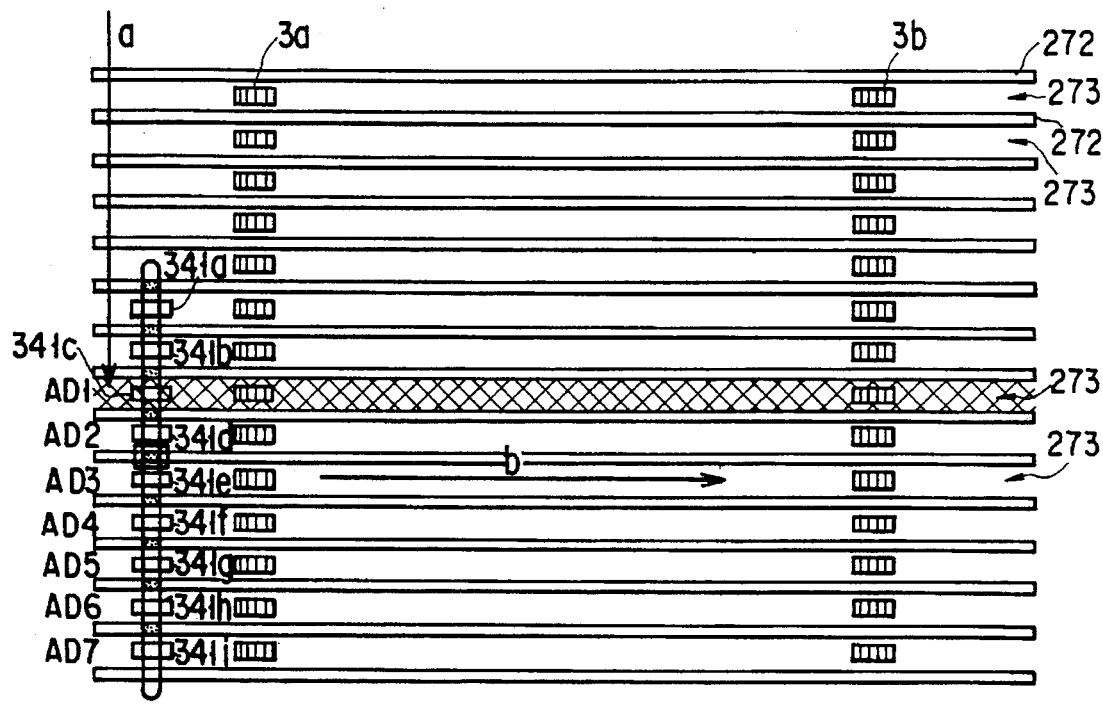
FIG. 12 is a view for explaining a track access in a second embodiment.
Figure 13:
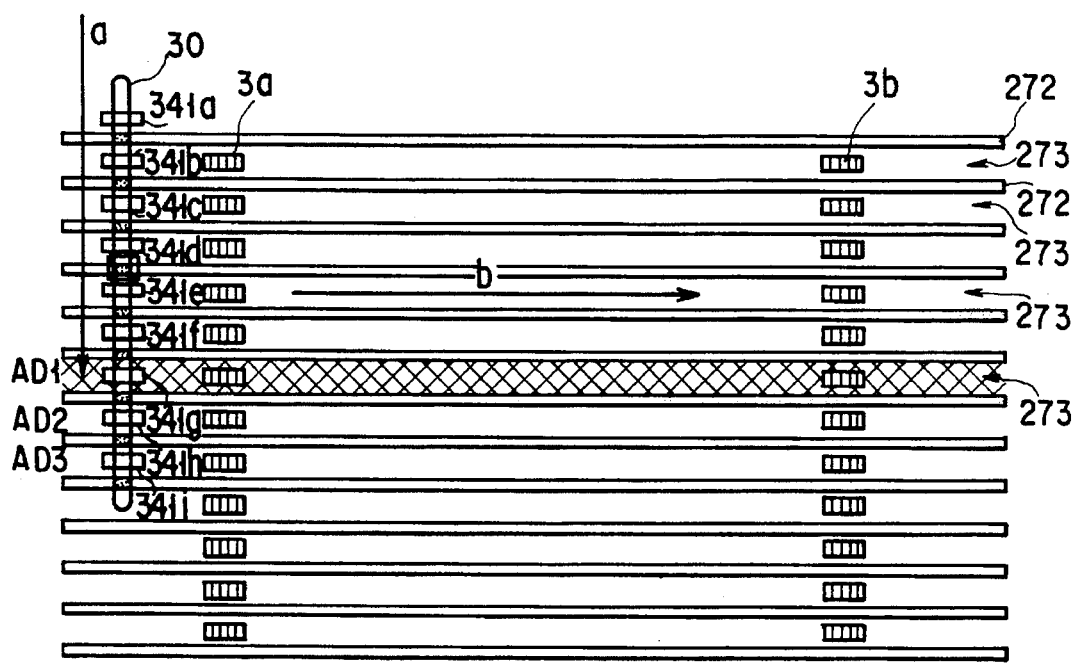
FIG. 13 is another view for explaining the track access in the second embodiment.

FIGS. 12 and 13 are views for explaining track access on the basis of the above idea.

In FIGS. 12 and 13, as in FIGS. 8 and 9, reference numerals 272 denote track guides; 273, tracks formed between the track guides 272; 30, a reproducing light beam radiated on the plurality of the tracks 273; and 341a to 341i, reproducing light-receiving elements for reproducing data of the tracks 273 on which the reproducing light beam is radiated.

In this case, since the nine reproducing light-receiving elements 341a to 341i are used, M=4 is satisfied, a track address corresponding to the reproducing light-receiving element 341e located at the central portion of the reproducing light-receiving elements 341a to 341i is defined as a current address at which a reproducing light beam 30 is currently located.

Figure 14:
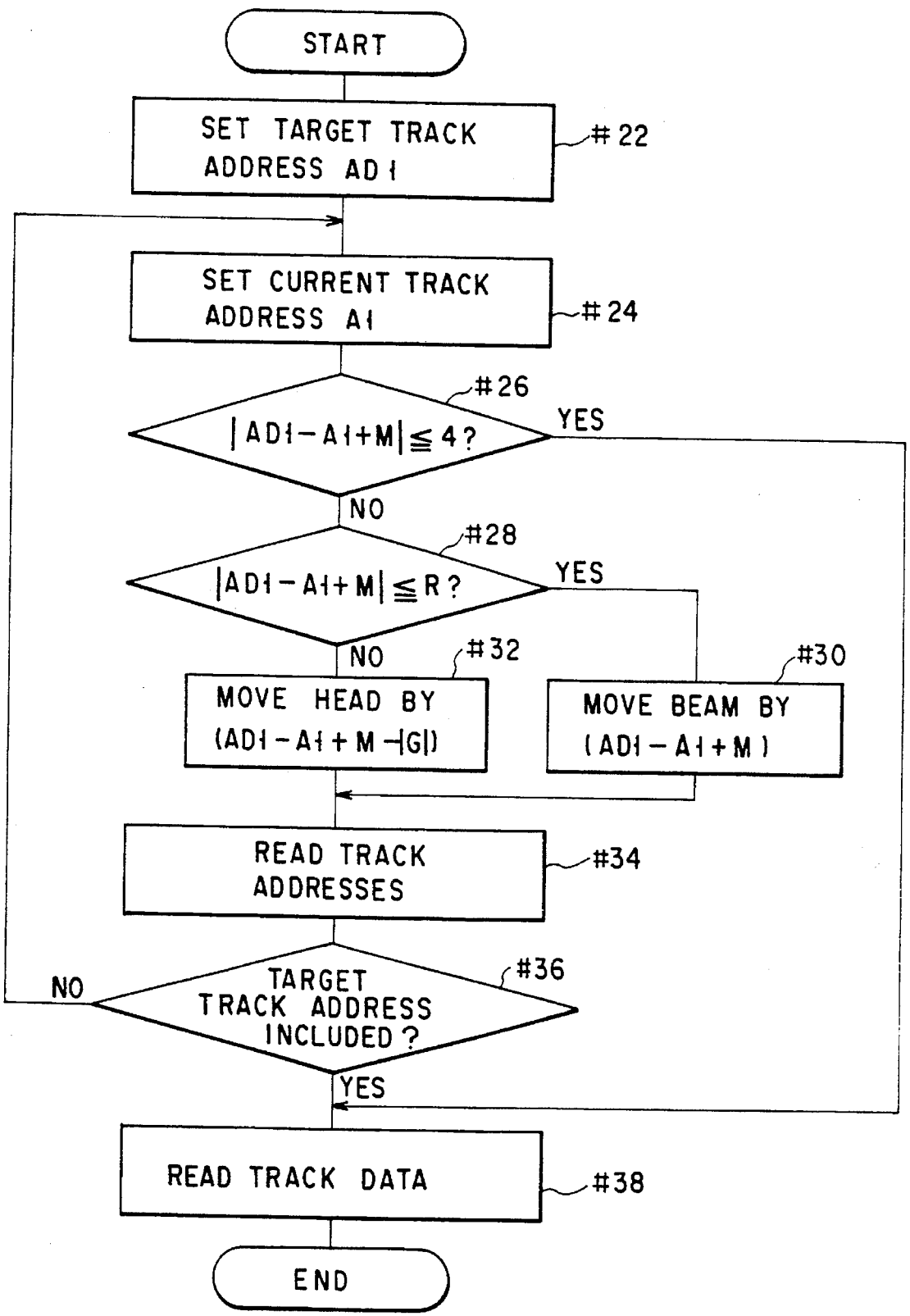
FIG. 14 is a flow chart for explaining the track access in the second embodiment.

When data reproduction of a given track address is designated by a host computer (not shown), the flow chart shown in FIG. 14 is executed.

A given track address AD1 is set as a target track address in step #22. An address A1 of a track 273 corresponding to the central reproducing light-receiving element 341e of the reproducing light-receiving elements 341a to 341i is set as a current track address in step #24.

It is determined in step #26 whether |AD1–A1+M| is 4 or less. The |AD1–A1+M| set to be 4 or less means that any one of the nine reproducing light-receiving elements 341a to 341i is located at the target track address AD1. Therefore, the flow jumps to step #38, and a data reproducing operation is performed.

When it is determined in step #26 that |AD1–A1+ M| is not 4 or less, a light beam must be moved, and it is determined in step #28 whether |AD1–A1+M| is a reference value R (e.g., 10) or less. This reference value is used to check whether coarse access for moving the head itself must be performed to move the beam or only fine access may be performed to move the beam. If YES in step #28, the objective lens is shifted by the objective lens moving means 36 to shift the light beam in the direction perpendicular to the tracks by a distance corresponding to |AD1–A1+M| (fine access) in step #30.

The moving direction of the light beam depends on the sign of (AD1–A1+M). If NO in step #28, in step #32, the reproducing light beam 30 is moved by a distance corresponding to |AD1–A1+M–|G|| in the direction perpendicular to the tracks by using coarse access for moving the optical head itself. The moving direction depends on the sign of (AD1–A1+M).

The card is moved in a track direction to read out a track address from the ID portion 3a of each of the nine tracks in step #34. It is determined in step #36 whether the target track address AD1 is included in the nine track addresses.

If NO in step #36, the flow returns to step #24, and the light beam is again moved by updating the current track address A1. If YES in step #36, data is read from the data portion 2 of the target track in step The above flow chart will be described again in accordance with the example shown in FIGS. 12 and 13. It is assumed that the maximum value of an error expected by performing coarse access is ±4. A target track address at which data reproduction is requested is represented by AD1, and a current track address at which 10 the light beam is located is represented by A1 (A1<AD1 and |AD1–A1|>R). In this case, in step #32, the reproducing light beam 30 is moved by a track count of (AD1–A1+M–|G|) in the direction of an arrow a in FIGS. 12 and 13.

FIG. 12 shows a case wherein a moving error g is +2, and FIG. 13 shows a case wherein the moving error is –2.

In the case (g=+2) in FIG. 12, the reproducing light-receiving element 341a is located at a track address (AD1+2) after the coarse access by AD1–A1+ M (+2) without error compensation. However, since the absolute value of error 4 is subtracted from AD1–A1+ M (+2) –4, the reproducing light-receiving element 341a is located two tracks before the target track address AD1, i.e., the reproducing light-receiving element 341c is located at the target track address AD1. Thereafter, the card is moved to relatively move the reproducing light beam 30 in the direction of an arrow b. When it is confirmed in the ID portion 3a of the card that one of the reproducing light-receiving elements 341a to 341i is located at the target track address AD1, the data of the target track is reproduced.

If continuous tracks of card are to be accessed, the tracks 27 need not be accessed again, since the data of the 6 tracks from the track addresses AD2 to AD7 are simultaneously reproduced upon reproducing the data of track AD1. Therefore, track access having a high efficiency can be obtained.

In the case (g=–2) in FIG. 13, the reproducing light-receiving element 341a is located two tracks before the target track address AD1, i.e., the reproducing light-receiving element 341c is located at the target track address AD1 without error compensation. However, since the absolute value of error 4 is subtracted from AD1–A1+M (–2)–4, the reproducing light-receiving element 341a is located six tracks before the target track address AD1, i.e., the reproducing light-receiving element 341g is located at the target track address AD1. Thereafter, the card is moved to relatively move the reproducing light beam 30 in the direction of an arrow b. When it is confirmed in the ID portion 3a of the card that one of the reproducing light-receiving elements 341a to 341i is located at the target track address AD1, the data of the target track is reproduced.

If continuous tracks of card are to be accessed, the tracks 27 need not be accessed again, since the data of the 2 tracks from the track addresses AD2 and AD3 are simultaneously reproduced upon reproducing the data of track AD1. Therefore, track access having a high efficiency can be obtained.

According to the second embodiment, when the reproducing light beam (corresponding to the first reproducing light-receiving element 341a) is to be moved to the target track address by coarse access, the moving amount of the reproducing light beam is corrected using the maximum value of error G expected in coarse access. Therefore, as the result obtained by performing coarse access once, the target track address AD1 can always fall within the multi-track range of the reproducing light-receiving elements 341a to 341i. In addition, when reproduction of each track is repeated while a track address is sequentially increased, the data of other track addresses following the target track address AD1 can be simultaneously reproduced. Therefore, the next track address need not be accessed again, and track access having a high efficiency can be obtained. As a result, the processing time for data reproduction can be considerably shortened, and the data reproduction can be performed at high speed.

A third embodiment will be described below. FIG. 15 shows a relationship between the values of access errors generated during coarse access and the frequency of the access errors in a conventional optical recording/reproducing apparatus. As is apparent from FIG. 15, the frequency of access errors is maximum at a point where the value of an access error is close to zero, and the frequency of access errors is abruptly decreased as the value of an access error is increased. When the value of an access error exceeds a predetermined value, an access error is rarely generated. In FIG. 15, the value of an access error whose frequency is almost zero is represented by G (±4).

In the third embodiment, a plurality of reproducing light-receiving elements are arranged for a reproducing light beam. In a multi-track read scheme in which a plurality of tracks can be read at a time by the plurality of reproducing light-receiving elements, the number N of reproducing light-receiving elements (the number of tracks which can be reproduced at a time) is defined as follows with respect to the maximum value ±G of an error generated in coarse access:

N>2G

Therefore, when an error in coarse access is ±G or less, a target track can be reproduced by performing scanning once after the coarse access is performed.

The arrangement of the third embodiment is the same as that of each of the first and second embodiments, and a detailed description of the arrangement of the third embodiment will be omitted. In the third embodiment, assuming that G=±4, the number of reproducing light-receiving elements is N=9. Note that the number N of light-receiving elements is the same as that of each of the first and second embodiments.

Figure 16:
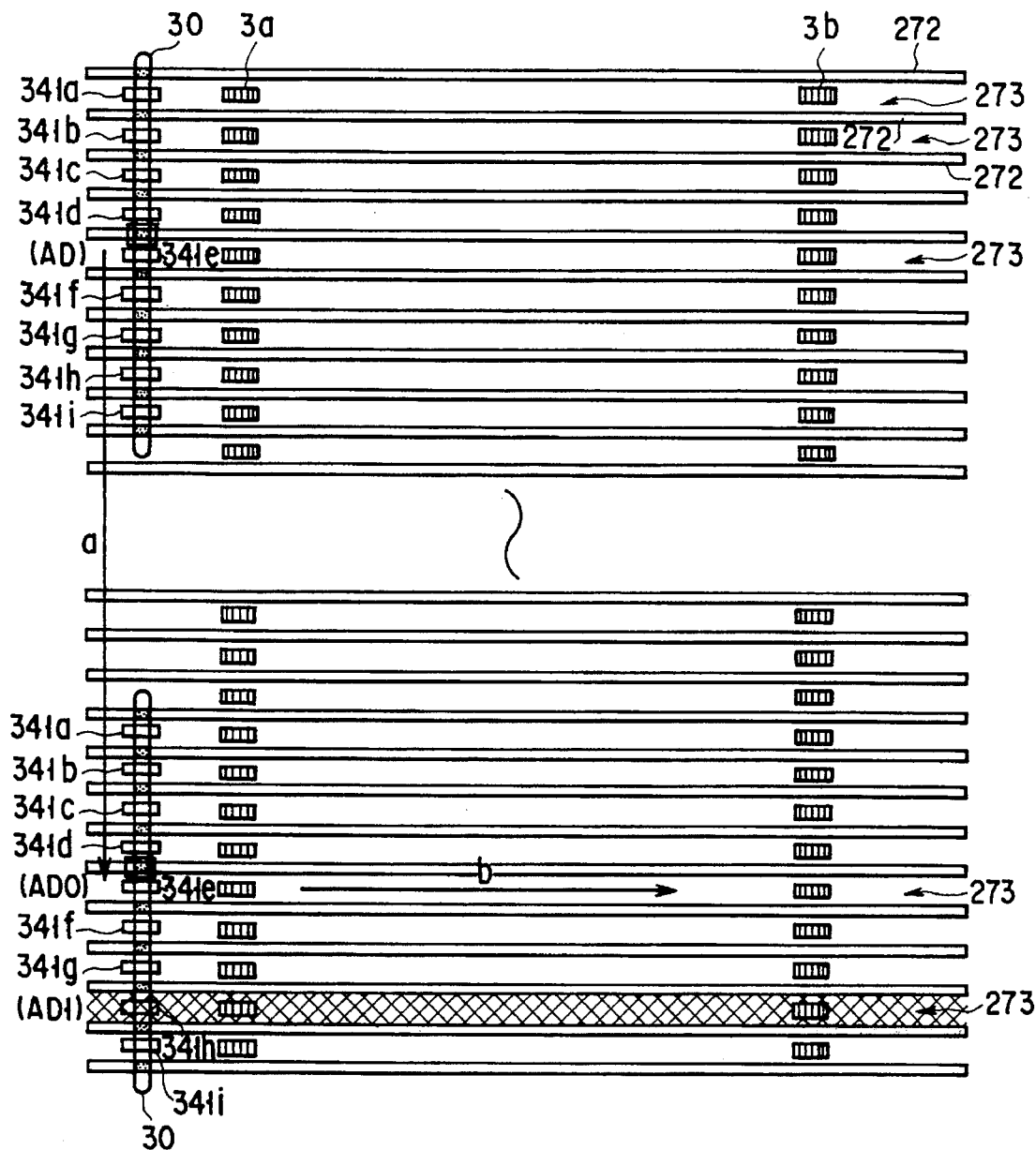
FIG. 16 is a view for explaining track access in the third embodiment.

FIG. 16 is a view for explaining a case wherein track access is performed by the optical recording/reproducing apparatus of the third embodiment of the present invention.

An address AD of track 273 corresponding to a central reproducing light-receiving element 341e of reproducing light-receiving elements 341a to 341i is defined as a current address at which reproducing light beam 30 is currently located.

When data reproduction of a given track address is designated by a host computer (not shown) and the designated track address is represented by AD1, the reproducing light beam 30 is moved in the direction of an arrow a in FIG. 16 by a difference between the current track address AD and the target track address AD1.

When the error of coarse access is assumed to be –3, the coarse access causes the reproducing light beam 30 to stop three tracks before the target track address AD1. That is, the reproducing light-receiving element 341e is located at an address AD0 three tracks before the target track address AD1.

However, as is apparent from FIG. 16, the reproducing light-receiving element 341h of the nine reproducing light-receiving elements 341a to 341i is located at the target track address AD1. Therefore, when the card is moved thereafter so as to relatively move the reproducing light beam 30 in the direction of the arrow b in FIG. 16, it is confirmed by an ID portion 3a of the card that the address of the track corresponding to the reproducing light-receiving element 341h is the target track address AD1, and the data of the track AD1 is reproduced.

It is understood that a target track can always be traced by one of the nine reproducing light-receiving elements 341a to 341i by performing coarse access once if the error is within a range between 0 to –4.

Figure 17:
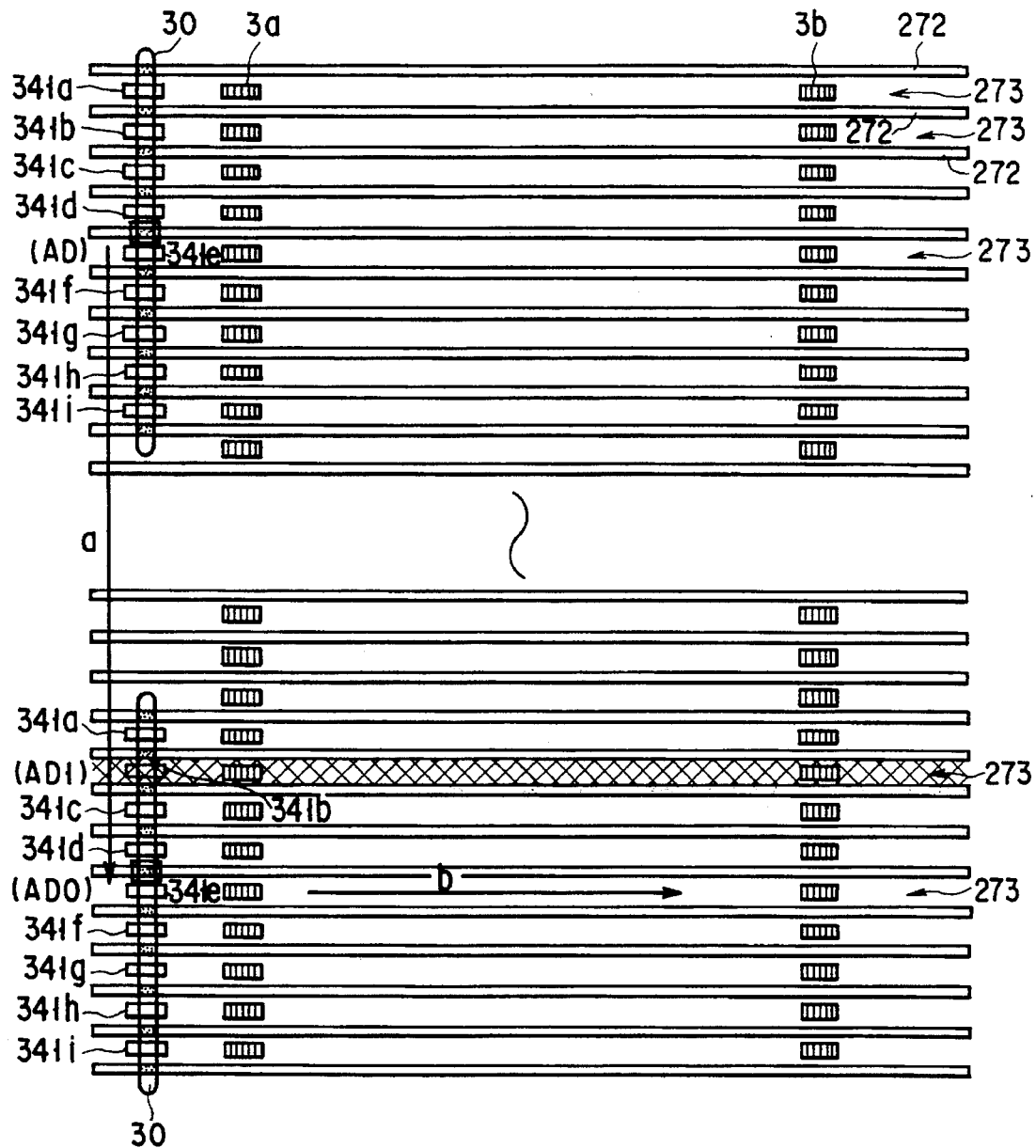
FIG. 17 is a view for explaining the track access in the third embodiment.

FIG. 17 shows a case wherein an error of coarse access is +3. The coarse access causes the reproducing light beam 30 to stop three tracks after the target track address AD1. That is, the reproducing light-receiving element 341e is located at an address AD0 three tracks after the target track address AD1.

However, as is apparent from FIG. 17, the reproducing light-receiving element 341b of the nine reproducing light-receiving elements 341a to 341i is located at the target track address AD1. Therefore, when the card is moved thereafter so as to relatively move the reproducing light beam 30 in the direction of the arrow b in FIG. 17, it is confirmed by an ID portion 3a of the card that the address of the track corresponding to the reproducing light-receiving element 341b is the target track address AD1, and the data of the track AD1 is reproduced.

It is understood that a target track can always be traced by one of the nine reproducing light-receiving elements 341a to 341i by performing coarse access once if the error is within a range between 0 to +4.

According to the third embodiment, when the reproducing light-receiving elements are arranged such that tracks having the number twice the errors of coarse access can be simultaneously reproduced, even when a moving distance between a current track address at which a light beam is currently located and a target track address is long, the data of the target track can be reproduced by performing coarse access once. The third embodiment has the following advantages in comparison with the prior art. That is, processing in which the error of coarse access is set to be 0 by fine access is not required. Although track scanning must be performed twice in normal access, the number of times of track scanning can be reduced to once in the coarse scanning of the third embodiment. As a result, the processing time for data reproduction can be considerably shortened, and the data reproduction can be performed at high speed.

The number N of multi-tracks must satisfy only a condition of N>2G. When the number of tracks which can be simultaneously reproduced is large, a target track address can easily be searched by performing coarse access once with respect to an error of the coarse access, and the time for reproducing data can be shortened. However, when the number of tracks which can be reproduced at a time is excessively large, a reproducing light beam is diverged to pose various problems such as degradation of a reproducing signal caused by a decrease in light amount per unit area, degradation of a reproducing signal caused by increases in various optical aberration, an increase in weight of a head itself caused by an increase in size of an optical element, and an increase in cost. Therefore, the number of tracks must be set within a practical range, as a matter of course.

As described above, according to the present invention, multi-track read can be performed by a reproducing light beam radiated on a plurality of tracks and a plurality of reproducing light-receiving elements corresponding to the plurality of tracks. Even when a moving distance between a current track address at which a light beam is currently located and a target track address is long, any one of the plurality of reproducing light-receiving elements can correspond to the target track by performing coarse access once, and the data of the target track can be reproduced. Therefore, processing performed by fine access can be omitted, the number of times of track scanning can be decreased to once, the processing time for data reproduction can be shortened, and the data reproduction can be performed at high speed.

According to the present invention, when a reproducing light beam portion is to be moved to the target track, an amount of movement of the reproducing light beam can be corrected by a coarse access error. Therefore, access is performed once so that the target track address can fall within a range of multi-track read performed by the reproducing light-receiving element. In addition, when there is a command in which tracks are reproduced one by one while a track address is sequentially increased, data of other track addresses following the target track can be simultaneously reproduced, and track access having a high efficiency can be obtained. As a result, the processing time for data reproduction can be shortened, and the data reproduction can be performed at high speed.

According to the present invention, the number of light-receiving elements for simultaneously detecting data of a plurality of tracks in a recording medium on which a reproducing light beam is radiated is determined by N>2G in accordance with an error ±G generated by coarse access. Therefore, even when a moving distance between a current track address and a target track address is long, the data of the target track can be reproduced by performing scanning once. Therefore, processing performed by fine access which is required in the prior art can be omitted, and the number of times of track scanning can be decreased to once. Therefore, the processing time for data reproduction can be considerably decreased, and the data reproducing can be performed at very high speed.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, since sequential access is generally performed in the direction of increasing a track address, continuous reproduction in the direction of increasing the track address has been described in the above embodiments. However, the present invention can be applied to continuous reproduction in a direction of decreasing a track address. In addition, although the second and third embodiments have been described on the assumption that an error range during coarse access is constant regardless of a moving amount, when an error is changed depending on a moving distance during coarse access, the error range ±G may be changed depending on the moving distance. Although nine reproducing light-receiving elements are used in each of the above embodiments, the number of reproducing light-receiving elements is not limited to nine. A recording medium is not limited to an optical card. An optical disk, a magneto-optical card, or a magneto-optical disk may be used as the recording medium. The above multi-track access is also applicable to the recording operation.

What is claimed is:

1. An apparatus for reproducing data, using light, from a data recording medium having a large number of data recording tracks, the data recording tracks also recording an address, the apparatus comprising:

means for generating a light beam which simultaneously covers and scans a plurality of tracks of said large number of data recording tracks;

detection means including a plurality of detection elements for detecting addresses of the plurality of tracks which are simultaneously covered and scanned by the light beam, the plurality of detection elements being arranged in a line and the plurality of detection elements including a centrally located detection element; and moving means for moving the light beam, in response to a reproduction request of a target track, by a distance corresponding to a distance difference between a track at which the centrally located detection element is currently located and the target, whereby the address of the target track is detected by said plurality of detection elements even if a moving distance of the light beam contains an error.

2. An apparatus according to claim 1, wherein said moving means moves said light beam generating means when said distance difference is not less than a predetermined value, and moves the light beam by shifting a scanning position of the light beam without moving said light beam generating means when said distance difference is less than the predetermined value.

3. An apparatus according to claim 2, wherein a distance that the light beam is moved by said moving means contains a moving error, and when said distance difference is not less than the predetermined value, said moving means moves said light beam generating means in accordance with said difference and the moving error.

4. An apparatus according to claim 2, wherein, a distance that the light beam is moved by said light beam moving means contains a moving error, a maximum moving error being represented by $\pm G$ tracks, and said light beam generating means generates a light beam which simultaneously scans not less than 2G tracks.

5. An apparatus according to claim 1, wherein said data recording medium is an optical card having a large number of tracks parallel to each other.

6. A method of simultaneously reproducing data of a plurality of tracks from an optical card having a large number of tracks thereon, using a multi-track type optical head for generating a light beam radiated on the plurality of tracks, comprising the steps of:
  (a) checking whether a distance difference between a track at which a central part of the light beam is currently located and a target track is not more than a given distance corresponding to a half of the number of the plurality of tracks;
  (b) when the checked distance difference is not more than the given distance, simultaneously reproducing addresses of the plurality of tracks at which the light beam is currently located, and when the checked distance difference is more than the given distance, further checking whether the checked distance difference is not more than a predetermined value which is not less than twice the given distance; and
  (c) when the twice-checked distance difference is not more than the predetermined value, moving the light beam in accordance with the twice-checked distance difference, and when the twice-checked distance difference is not less than the predetermined value, moving said optical head in accordance with the twice-checked distance difference, whereby an address of the target track is reproduced by said plurality of detection elements after the step (c) even if a moving distance of the light beam contains an error.

7. A method according to claim 6, wherein the step (c) comprises the substep of, when the checked distance difference is more than the predetermined value, moving said optical head in accordance with the distance difference and a moving error contained in the distance by which said optical head is moved.

8. An apparatus for simultaneously reproducing data of a plurality of tracks from an optical card having a large number of tracks thereon, using a movable multi-track type optical head for generating a light beam radiated on the plurality of tracks, wherein, the optical head is moved, in response to a reproducing request of a target track, by a distance corresponding to a distance difference between a track at which a centrally located detection element is currently located and the target track and, when a movement distance of the optical head contains a moving error, and the number of tracks of a maximum moving error included in said movement distance is represented by $\pm G$, the number of the plurality of tracks which are simultaneously reproduced by said optical head being not less than 2G.

9. An apparatus for simultaneously reproducing data of a plurality of tracks from an optical card having a large number of tracks thereon, using a multi-track type optical head for generating a light beam radiated on a plurality of tracks, wherein, when a movement distance of the optical head contains a moving error, and the number of tracks of the moving error included in said movement distance is represented by $\pm G$, an amount of movement of said optical head is determined in advance of any movement of the optical head in accordance with G and a distance difference between a current track and a target track.

10. An apparatus for optically reproducing data recorded on a data recording medium having data recording tracks, the apparatus comprising:
  means for generating a light beam which simultaneously illuminates a plurality of tracks of said data recording tracks;
  detection means including a plurality of detection elements arranged in a line for receiving the light beam from the plurality of tracks and for detecting said data recorded on each of the plurality of tracks; and
  moving means for relatively moving the light beam across said data track, in response to a reproduction request of a target track, by a distance corresponding to a distance difference between a track at which a centrally located detection element of the plurality of detection elements and the target track, whereby data of the target track is detected by said plurality of detection elements even if a moving distance of the light beam contains an error.

* * * * *